United States Patent
Prenger et al.

(10) Patent No.: US 6,596,182 B1
(45) Date of Patent: Jul. 22, 2003

(54) MAGNETIC PROCESS FOR REMOVING HEAVY METALS FROM WATER EMPLOYING MAGNETITES

(75) Inventors: F. Coyne Prenger, Los Alamos, NM (US); Dallas D. Hill, Los Alamos, NM (US); Dennis D. Padilla, Los Alamos, NM (US); Robert M. Wingo, Los Alamos, NM (US); Laura A. Worl, Los Alamos, NM (US); Michael D. Johnson, Las Cruces, NM (US)

(73) Assignee: The Regents of the University of California, Oakland, CA (US)

( * ) Notice: Subject to any disclaimer, the term of this patent is extended or adjusted under 35 U.S.C. 154(b) by 10 days.

(21) Appl. No.: 09/776,608

(22) Filed: Feb. 2, 2001

(51) Int. Cl.[7] .............................. C02F 1/00; C02F 1/48; B01D 35/06

(52) U.S. Cl. ...................... 210/798; 210/912; 210/913; 210/914; 210/222

(58) Field of Search ................................ 210/798, 912, 210/913, 914, 222

(56) References Cited

U.S. PATENT DOCUMENTS 3,891,551 A * 6/1975 Tiedemann ................. 210/193
3,931,007 A * 1/1976 Sugano et al. .............. 210/717

(List continued on next page.)

OTHER PUBLICATIONS

Watson, J H P., "Magnetic Filtration," J. App. Physics, vol. 44 No. 9 Sep. 1973, pp. 4209–4213.*
Watson, J H P., "Applications of and Improvements in High Gradient Magnetic Separation," Filtration & Separation, Jan./Feb. 1979, pp. 70–75.*

Padilla DD et al.; Heavy–metals removal from water with remnant magnetic field and in situ magnetite formation; SciSearch® Database of the Institute for Scientific Information®, Inc. 2000; pp. 1.

Weixing Wang et al; Fundamental Study of an Ambient Temperature Ferrite Process in the Treatment of Acid Mine Drainage; Department of Mining & Metallurgical Engineering, Environmental Science & Technology, vol. 30, No. 8, 1996; pp. 1–5.

Oscar Perales Perez et al.; Precipitation and densification of magnetic iron compounds from aqueous solutions at room temperature; Hydrometallurgy 50 (1998); pp. 223–242.

(List continued on next page.)

*Primary Examiner*—Chester T. Barry
(74) *Attorney, Agent, or Firm*—Madson & Metcalf (57) ABSTRACT

A process for removing heavy metals from water is provided. The process includes the steps of introducing magnetite to a quantity of water containing heavy metal. The magnetite is mixed with the water such that at least a portion of, and preferably the majority of, the heavy metal in the water is bound to the magnetite. Once this occurs the magnetite and absorbed metal is removed from the water by application of a magnetic field. In most applications the process is achieved by flowing the water through a solid magnetized matrix, such as steel wool, such that the magnetite magnetically binds to the solid matrix. The magnetized matrix preferably has remnant magnetism, but may also be subject to an externally applied magnetic field. Once the magnetite and associated heavy metal is bound to the matrix, it can be removed and disposed of, such as by reverse water or air and water flow through the matrix. The magnetite may be formed in-situ by the addition of the necessary quantities of Fe(II) and Fe(III) ions, or pre-formed magnetite may be added, or a combination of seed and in-situ formation may be used. The invention also relates to an apparatus for performing the removal of heavy metals from water using the process outlined above.

13 Claims, 2 Drawing Sheets

U.S. PATENT DOCUMENTS

| | | | | |
|---|---|---|---|---|
| 4,701,261 A | * | 10/1987 | Gibbs et al. | 210/606 |
| 4,781,298 A | * | 11/1988 | Hemstock et al. | 209/214 |
| 5,441,648 A | * | 8/1995 | Lidzey | 210/695 |
| 5,538,701 A | | 7/1996 | Avens et al. | 423/3 |
| 5,628,900 A | * | 5/1997 | Naito | 210/223 |
| 5,652,190 A | * | 7/1997 | Kochen et al. | 134/29 |
| 5,702,590 A | * | 12/1997 | Bonte et al. | 208/251 R |
| 5,795,471 A | * | 8/1998 | Naito | 210/223 |
| 5,855,790 A | * | 1/1999 | Bradbury et al. | 210/222 |

OTHER PUBLICATIONS

Oscar Perales Perez et al; Ambient–temperature synthesis of metal–bearing ferrites: how and why?; Journal of Alloys and Compounds 290 (1999); pp. 129–136.

G.P. Home et al; The Sirofloc Process at Remires Water–Treatment Works; J.IWEM (Feb. 6, 1992); pp. 10–19.

* cited by examiner

MAGNETIC PROCESS FOR REMOVING HEAVY METALS FROM WATER EMPLOYING MAGNETITES

GOVERNMENT RIGHTS

This invention was made with Government support Contract Number W-7405-ENG-36 awarded by the United States Department of Energy to the Regents of the University of California. The Government has certain rights in the invention.

BACKGROUND OF THE INVENTION

1. The Field of the Invention

The present invention relates to the use of magnetites and magnetic separation to bind and remove heavy metals from water. More specifically, the present invention relates to binding heavy metals in water to magnetite and then removing those bound heavy metals from the water by magnetic separation. In one aspect of the invention the heavy metal-containing magnetite is removed from the water by flowing the water past a solid matrix displaying remnant magnetism.

2. The Relevant Technology

Water pollution is a serious problem in the United States and throughout the world. In the last several decades water pollution has been the subject of increased government scrutiny and regulation. In response to the need for clean drinking water and the need to maintain clean water in rivers, lakes, oceans, and wet lands, detailed statutory and regulatory schemes have been developed at the state and local levels in the United States. These statutory and regulatory schemes relate to many types of activities that can produce water pollution. Such activities include everything from controlling the quality of run off from farming operations and in storm drainage systems, to the regulation of industrial, mining, and commercial activities. Almost any activity that produces or has the capability of producing significant quantities of tainted water will be regulated by state and federal regulations. Several regulatory agencies deal extensively with the regulation of water emissions. Some of these agencies include the United States Environmental Protection Agency (EPA) which has broad regulatory authority, the United States Coast Guard which regulates the use of navigable waters, state Oil and Gas Boards which regulate produced waters at well sites, and state and federal agencies dealing with mine regulation.

Various water pollutants, and specific activities which have the capability of producing water pollution, are the subject of water quality regulations. Materials that may be regulated range from pesticides and fertilizers, to oil and numerous chemicals and hazardous materials. Any material that may arguably be detrimental if placed in the water supplies of the nation are subject to regulation and controlled emission.

Heavy metals are one class of problematic water pollutant which is encountered widely in the environment. Essentially all transition metals can exist as dissolved ions in water. Examples of heavy metals which may become water pollutants include lead, manganese, cobalt, cadmium, and others. These materials present significant water pollution problems when they exist in a stream or water supply. Consuming water containing heavy metals is detrimental to the health of humans and animals alike. Heavy metal poisoning can be a serious public health issue. Accordingly, there is significant interest in removing heavy metals from water supplies.

At the same time, removal of heavy metals from water in bulk is a difficult and expensive process. While the chemistry of heavy metals is well understood, applying that chemistry to remove heavy metals from water in the environment and at ambient conditions has proven difficult and expensive. These processes often require large bulky processing facilities and can produce waste products which are themselves hazardous and pose difficult disposal issues.

Adding to the problem is that fact that some old industrial and mining operations have produced heavy metal emissions over many decades and in some cases for more than a century. Many of these operations pre-date modem water pollution control regulation and the development of modem water pollution control technology. Thus, these operations produced heavy metal emissions with not much effort directed to removal of the metals from the water or limitation of the pollutants prior to their release into the environment.

Where these types of facilities have continued in operation, they have been brought up to standards by the application of the necessary modifications as required by the regulatory schemes mentioned above. However, in cases where mines and other industrial facilities closed down prior to the implementation of pollution control systems and technology and the implementation of modem regulatory schemes, it is quite possible for such facilities to continue to produce water emissions tainted by heavy metals.

This is particularly true of mining operations which may have ground water flowing through them and exits into local streams and drinking water. Heavy metal contamination of natural water sources continues to be a problem in the mining communities long after mining has ceased. Due to the undesirability of heavy metal pollution in the water, much effort and expense is necessary to remediate these problems, often with less than adequate results.

Many problems exist with traditional heavy metal or water treatment remediation methods. As mentioned above, the chemistry of the metals involved is well known, so the various known processes are documented. One such method is metal hydroxide precipitation to remove heavy metals; however, this and many other conventional methods involve adding large quantities of chemicals to the waste stream which might contain quantities of contaminants at levels less than parts per thousand. These types of procedures can result in large quantities of metal-contaminated or metal-containing precipitate. As mentioned above, the disposal of the resultant metal-laden precipitate presents disposal problems of its own, particularly if the precipitate has the potential of later leaching of metals back into the environment.

Most of the known processes require complex and bulky equipment. These processes are expensive and sometimes result in less than adequate cleaning of the water. Conventional processes often result in a waste material that itself is hazardous and must be disposed of using expensive techniques which are the subject of further EPA regulation.

Thus, it would be a significant advancement in the art to provide improved methods and apparatus for cleaning water. More particularly, it would be a significant advancement in the art to provide such methods and apparatus which were capable of removing heavy metals from water. It would be an advancement in the art to provide such methods and apparatus which were capable of removing heavy metals from water without the use of chemical additives that produce large quantities of unstable chemical sludge. It would be a further advancement in the art to provide such methods and apparatus that operated using facilities significantly smaller than conventional water treatment facilities. It would be an advancement in the art to provide such methods and apparatus which were less costly to operate than conventional apparatus, and which were capable of producing waste products that were not themselves hazardous.

BRIEF SUMMARY OF THE INVENTION

The methods and apparatus of the present invention have been developed in response to the present state of the art, and in particular, in response to the problems and needs in the art that have not yet been fully solved by currently available water treatment methods and apparatus. To achieve the desired advantages mentioned above, and in accordance with the invention as embodied and broadly described herein in the preferred embodiment, methods and apparatus for removing heavy metals from water are disclosed herein.

In one aspect the present invention relates to a process for removing heavy metals from water. As discussed above, the removal of heavy metals from water is a major problem in maintaining and improving water quality. The process involves introducing or forming magnetite in water containing heavy metals such that the heavy metals are bound to the magnetite. Magnetite is an iron oxide with the formula $Fe_3O_4$. Magnetite occurs as a mineral and is a multi-valence oxide having both Fe(II) and Fe(III) in the same inverse spinel structure. It is found that magnetite is extraordinarily magnetic. Also, because of the inverse spinel structure of the mineral, it is possible for other metals to become incorporated into the magnetite crystal matrix. Metals can be incorporated chemically, or they can be absorbed onto the existing magnetite structure. In either event, these phenomena will be referred to herein as "binding" or having the metal "bound" to the magnetite. These terms are used to incorporate both chemical binding and adsorption for purposes of describing the present invention. In addition, the resulting products will be referred to collectively as "magnetite." Compounds which include metals chemically bonded within the magnetite structure are sometimes referred to in the art as "ferrites." However, it will be understood, that for the purposes of this invention, such "ferrite" compounds fall within the scope of the term "magnetite" as used herein.

The process of the present invention includes the steps of introducing magnetite to a quantity of water containing at least one heavy metal. One example of such water is mine drainage. Some of the experimental examples provided below use mine effluent from the Leadville mine drainage tunnel at Leadville, Colo. in order to demonstrate the present invention. Next, magnetite is mixed with the water, or formed in-situ, such that at least a portion of, and preferably most of, the heavy metal in the water is bound to the magnetite. Once the heavy metal is bound to the magnetite, the magnetite and heavy metal are removed by the application of a magnetic field. Since the magnetite is magnetic, it is easily separated from water by the application of a magnetic field in the presence of a magnetically active capturing matrix.

In most embodiments of the present invention the application of a magnetic field is accomplished by flowing the water through a solid magnetized matrix such that the magnetite magnetically binds to the solid matrix. The magnetized matrix may, for example, comprise steel wool. The steel wool can either be pre-magnetized, and therefore demonstrate "remnant magnetism," or the steel wool can be placed under the influence of an external magnetic field generated by either an electromagnet or a permanent magnet.

In this configuration good results are achieved when the superficial velocity of the water through the matrix is in the range of from about 0.5 cm/sec to about 2.0 cm/sec. More preferably, the superficial velocity of water through the matrix is about 1 cm/sec. In order to adjust to larger or smaller inlet flow rates of water, the apparatus of the present invention is modular and scalable such that different flow rates can be handled while maintaining the superficial velocity within the preferred range.

Magnetite can be introduced to the process in several ways. The two main types of introduction of magnetite include the introduction of pre-formed magnetite to the water and the formation of magnetite in situ. The introduction of pre-formed magnetite may involve simply adding commercially available magnetite to the water to be treated. When using this process it is expected that the heavy metal removed will be metal adsorbed onto the magnetite.

Alternatively, the magnetite may be made in situ. In this process, effective quantities of Fe(II) and Fe(III), such as in the form of Fe(II) sulfate and Fe(III) sulfate, are added to the water. It is believed that magnetite is formed in a two stage process. First "green rust," which is (Fe(II) oxy-hydroxides), are formed. This is followed by dehydration with and incorporation of Fe(III) to form magnetite. It is believed that in-situ formation of magnetite (ferrite) involves the incorporation of at least a portion of the heavy metal into the magnetite structure. Thus, the heavy metal is chemically bound within the magnetite inverse spinel structure.

A wide variety of heavy metals can be removed from water using the present invention. Examples of the heavy metals which can be removed from water include lead, manganese, cadmium, cobalt, mercury, nickel, and silver. In essence, the process is widely applicable to transition metals, actinides, and lanthanides.

Once the magnetite (ferrite) is formed and the heavy metals are bound to the magnetite, the resulting complex is flowed through a solid matrix. As mentioned above, the matrix may, for example, be steel wool. Also as mentioned above, the steel wool may display remnant magnetism, or it may be subject to an external magnetic field.

As the heavy metal-magnetite complex passes through the solid matrix, it is magnetically bound to the matrix. Thus, the heavy metal is removed from the aqueous system. Once the matrix becomes loaded with the bound magnetite it is a simple matter to remove and dispose of the bound magnetite. One such removal process is to reverse flow through the apparatus and increase the superficial velocity such that the magnetite is physically removed from the solid magnetic matrix. Generally a reverse flow of water, or more preferably an air-water mixture, is suitable. Flow rates somewhat higher than the initial flow rates thrugh the device are preferred. In particular, it is found that superficial velocities in the range of from about 3 cm/sec to about 10 cm/sec work well. This is in contrast to forward superficial velocities in the range of about 1.0 cm/sec.

The heavy metal bound magnetite is then collected and disposed of. It is found that, especially in the case of magnetite formed in situ, the heavy metal does not leach appreciably after disposal. Therefore, it is possible to use inexpensive disposal methods.

The present invention also relates to an apparatus for achieving the heavy metal remediation process described above. The apparatus can be constructed, for the most part of conventional components. In basic terms, the apparatus of the present invention includes a water conduit for introducing water containing heavy metals into the apparatus. The apparatus also includes a conduit for introducing a quantity of magnetite, or the components to synthesize magnetite in situ, into the apparatus. The water and the magnetite are mixed in a reaction chamber such that at least a portion of the heavy metals are bound to the magnetite. Next the mixture of water and heavy metal bound magnetite is introduced into a magnetic separator configured such that magnetite is removed from the water by application of a magnetic field. The separator preferably includes a solid matrix positioned within the separator and containing a remnant magnetization. The treated water is then conducted back out of the device by an outlet conduit.

As discussed above, the matrix within the separator may have remnant magnetism. Alternatively, an external magnet is provided to produce the necessary magnetic field gradients in the matrix material.

There are several advantages to the present invention over the conventional technology of heavy metal removal. The present invention provides a much smaller facility footprint, less chemical additives required and consequently less sludge produced than with conventional processes. Magnetic separation will even work on elements that are not intrinsically ferromagnetic or paramagnetic by the proper seeding of iron based compounds to the waste stream which act to scavenge the nonmagnetic contaminants.

The present invention demonstrates the several advantages of this technology. It has been found that remnant field separator performance on commercial magnetite at particle sizes greater than 5 $\mu$m is more than adequate. Collection in and purging of the matrix can be controlled by superficial velocity and gas sparging. No magnetic field adjustment is required. Remnant field matrices appear to be magnetically stable and require minimal maintenance. Use of a graded matrix may effectively address a wider range of particle sizes if that is required.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

As discussed above, the present invention relates to effective, yet inexpensive, methods and apparatus for removing heavy metals from water. This is a persistent and difficult problem in environmental control and remediation. The present invention is based upon the use of magnetite to bind heavy metals in water. Since magnetite is extremely ferromagnetic, it is then a simple matter to remove the magnetite and bound heavy metals from the water by application of a magnetic field.

In order to apply this invention to typical remediation work, it is desirable to produce magnetites at relatively low temperature such that magnetite can be produced in situ. The formation of magnetites down to temperature as low as 6° C. and as high as 70° C. has been accomplished. Reaction times for seeded, in-situ formation, at 6° C. are 15–45 minutes. Studies have shown the ability to form magnetites, dependent on the nature of the waters in which formation is achieved. For example, high quality magnetites have been produced from distilled water and from mine water from the Leadville Mine Drainage Tunnel Treatment Facility in Colorado (hereinafter "LMDT waters") at 70° C. As discussed above, the procedure involves adding stoichiometric amounts of iron(II) and iron(III) sulfate to a heated solution to be treated, adjusting the pH to 8–9 using sodium hydroxide. At this point the colored suspension turns dark black and green, indicating the formation of magnetites and green rust. After approximately a one hour reaction time, higher order magnetite/ferrite crystals are observed.

It was initially observed that at low temperatures of 6° C., the LMDT water slowed magnetite formation. Initially dissolved oxygen was believed to be an inhibitor due to oxidation of the iron(II) present in solution; however, deoxygenation with argon did not fully alleviate the problem. It was then concluded that the inhibition was apparently due to competition from other ions for hydroxide or from formation of another solid phase that competes with magnetite formation. Since calcium and magnesium are the two principle "other" ions in the LMDT water, formation efficacy in the presence of both of these at concentrations reported at the LMDT facility was examined. It was observed that while magnesium produced a slightly more flocculent product, it did not interfere with magnetite formation whereas calcium inhibited the process. As will be discussed further in the Examples section below, the process has been developed such that interference by calcium in solution has been minimized.

It is believed that magnetite formation is a two stage process: (1) initial formation of a "green rust" (Fe(II) oxy-hydroxides); (2) followed by dehydration and incorporation of Fe(III) to form magnetite.

Remediation studies at 6° C. have been carried out using lead(II) and manganese(II) as test metals. The magnetite in-situ process effectively removes both lead and manganese to the parts per billion (ppb) range. It is important to note that at very low Fe:M ratios, incomplete magnetite/ferrite formation occurs as evidenced by some brown compound precipitating from solution. However this is all removed when passed through a simple magnetic separation device (a magnet with a steel wool column).

Remediation studies at 6° C., pH 9 have been carried out using cadmium(II), cobalt(II) and lead(II) as test metals. Initially cadmium(II) removal was studied using both distilled and LMDT water sources with a variety of magnetites and with various cadmium contamination levels.

The magnetite in-situ process effectively removes cadmium from high and low concentrations to the ppb or sub-ppb range, depending on the initial cadmium concentration and iron doses. There is a dependence upon the nature of the magnetite used. The best removal is observed for magnetites that are synthesized in the laboratory and used shortly thereafter. Using this source, excellent removal is observed at a magnetite dose of 100 ppm.

Although commercial magnetite is also effective in removing the target metal, higher doses, up to 500 ppm, are required. Surface activation of the commercial product is also important in cadmium(II) remediation. This requires "soaking" the commercial magnetite in 1.0M NaOH for 10–30 minutes followed by filtering off and washing the magnetites with distilled water to remove any remaining base. Activation using 0.5M $Ba(OH)_2$ shows equally effective activation.

In summary, in-situ formation of magnetites presents the presently preferred method for heavy metal removal in both pure water and LMDT water. The use of preformed magnetites is also an effective method for the remediation of heavy metals from LMDT water sources. Further, it is found that combining seeding with preformed magnitite and in-situ formation presents further improvement in some cases with respect to metal capture and magnetite removal.

The present invention also involves an apparatus for accomplishing separation of heavy metals from water. The presently preferred embodiments of the present invention will be best understood by reference to the drawings, wherein like parts are designated by like numerals throughout. It will be readily understood that the components of the present invention, as generally described and illustrated in the figures herein, could be arranged and designed in a variety of different configurations. Thus, the following more detailed description of the embodiments of the apparatus, system, and method of the present invention, as represented in FIGS. 1 and 2, is not intended to limit the scope of the invention, as claimed, but is merely representative of presently preferred embodiments of the invention.

Figure 1:
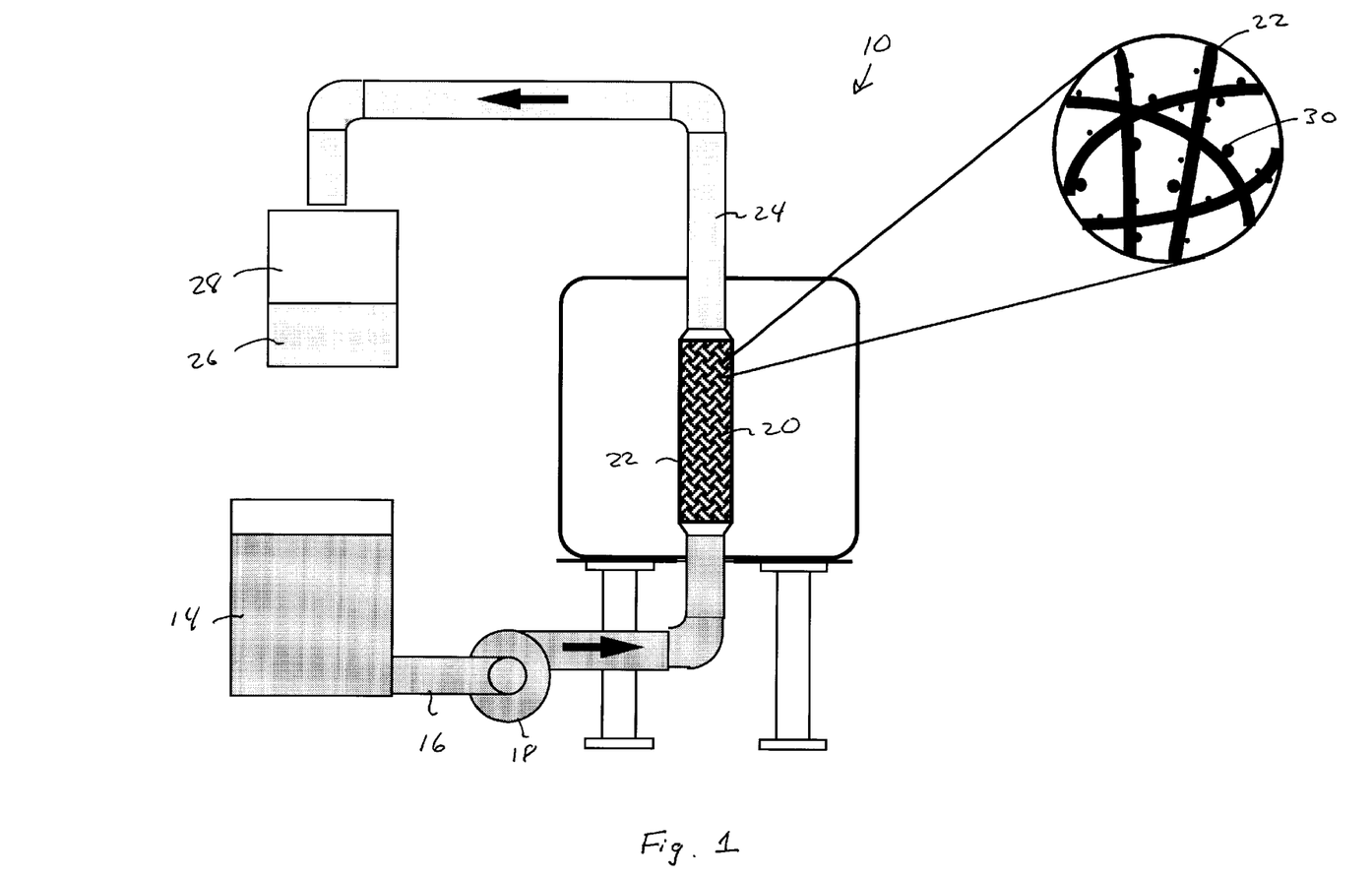
FIG. 1 is a block diagram illustrating an embodiment of the present invention utilizing a remnant magnetic field.
Figure 2:
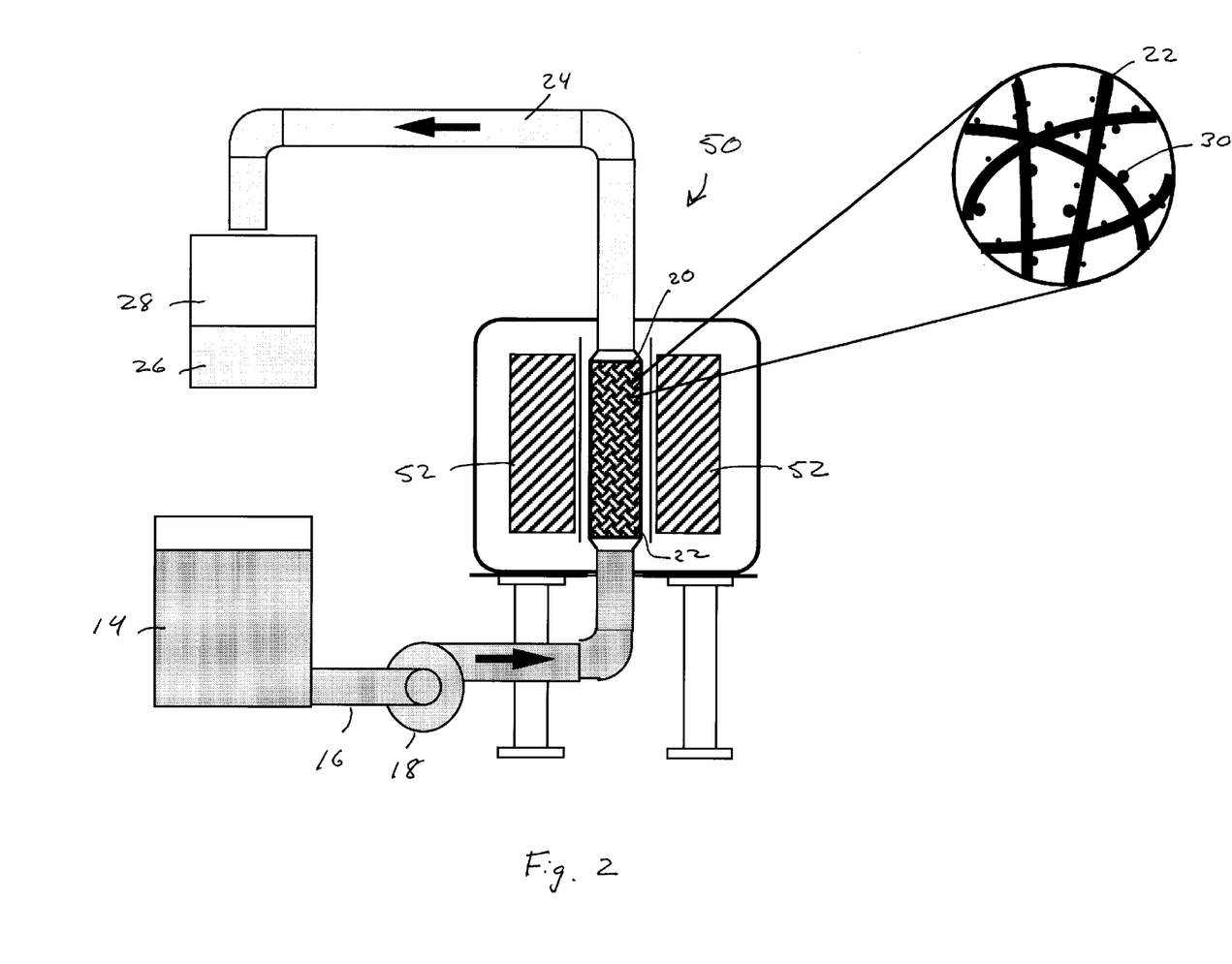
FIG. 2 is a block diagram illustrating a further embodiment of the present invention utilizing an external magnet.

FIG. 1 is a diagram illustrating an apparatus 10 for implementing the process of the present invention. A water source (not shown) is connected to the remainder of the apparatus by a water inlet conduit which leads to a mixing chamber 14 for the formation of a feed slurry. The water source may be a stream, lake, spring, or other source of contaminated water.

Also provided is a source of magnetite, or the precuror components (Fe(II) and Fe(III)) to form magnetite in situ. The magnetite or magnetite precursors are conducted to the mixing chamber 14 as well. In the mixing chamber 14, the magnetite is formed, if necessary. The heavy metals are allowed to contact the magnetite, or magnetite precursors, and become bound to the magnetite.

Next the heavy metal-magnetite complex is convey by a conduit 16 and a pump 18 into a magnetic separator 20. There is a magnetic field applied within the magnetic separator 20 such that the magnetite and bound metals are removed from the water. In the embodiment illustrated in FIG. 1, a solid ferromagnetic matrix 22 is disposed within the magnetic separator 20. The solid matrix 22 may, for example, comprise stainless steel wool. As described elsewhere herein, the solid matrix 22 illustrated in FIG. 1 has previously been subjected to magnetism such that the solid matrix 22 now displays sufficient remnant magnetism to bind the magnetite. In the expanded window portion of FIG. 1, the manner in which the magnetite particles 30 are bound to the steel wool matrix 22 is illustrated.

Once the metals and magnetite are removed from the water, the purified water leaves the magnetic separator 20 via conduit 24 and forms a quantity of purified water 26 which can be safely used or released into the environment. As illustrated in FIG. 1, the purified water may be held in a storage vessel 28.

Once the magnetite and bound metal is separated from the solid matrix it can be collected in a collection vessel. As discussed herein, it is found that the magnetite-metal complex is generally easily disposed of. Particularly in cases where the magnetite is formed in situ, it is found that the metal does not leach out of the waste material. Accordingly, it is possible to dispose of the waste in lower cost waste disposal facilities. Unlike many conventional processes, the methods and apparatus of the present invention do not produce large volumes of chemical waste.

FIG. 2 illustrates an alternative embodiment of the device 50. Once again the device has a mixing chamber 14. The mixing chamber 14 has an outlet conduit 16 and an associated pump 18 for conveying the water/magnetite slurry or mixture to the separator 20.

The difference between the embodiment of the device illustrated in FIG. 1 and that illustrated in FIG. 2 is that in FIG. 2 an external source of magnetism is provided. This may, for example, comprise an electromagnet 52. The other aspects of the invention are the same and similar results are achieved.

Magnetic separation of this nature has been demonstrated to be effective. The proposed method is based on utilizing the magnetic hysteresis found in certain hard magnetic materials. Specifically, 430 series stainless steel wool possesses such characteristics and can be used as a suitable matrix material for magnetic capture of the magnetite floc. By applying a steady state magnetic field in excess of 2 tesla to this material, a saturation magnetization can be achieved. Upon removal of the applied field, a remnant magnetic field remains in the matrix material. As discussed above, it is also necessary to periodically remove the collected magnetite from the matrix. Because of the relatively low magnetic field gradients in the remnant field, it is possible to accomplish matrix cleaning using a high superficial velocity backflush, if necessary accompanied by air sparging and/or mechanical vibration.

A tubular matrix containing the proper grade of 400 series stainless steel wool at the optimum packing density is one of the presently preferred candidates. After determining the optimum length, the cylindrical configuration is scalable by increasing its diameter to obtain the desired volume. As discussed above, backflushing of the matrix can be accomplished with an increased superficial velocity and air sparging.

Breakthrough tests, conducted under remnant field conditions, are used to define the specific matrix capacity under various operating conditions. The specific matrix capacity is a function of superficial velocity, magnetic field, magnetite particle size and carrier fluid viscosity. The remnant field in the matrix has also been measured and determined that the maximum value is approximately 800 G. In addition, the magnetite particle size in the slurry will be similar to the seed material introduced to facilitate the in-situ formation of magnetite. Therefore, the remaining variables affecting the breakthrough capacity are the superficial velocity, the bed length and the effective matrix fiber diameter.

A number of matrix samples have been investigated because it is advantageous to use the coarsest grade of steel wool that provides adequate magnetite removal. The coarser grades are easier to backflush, which translates to shorter flush times and lower flush volumes. The finer grades have higher capacity and increased capture efficiency.

Experimental results confirmed the utility of the methods of the present invention. These results indicate that a separator design based on a single-pass cylindrical matrix of uniform packing and containing a remnant magnetic field applied at two tesla is an acceptable configuration. This design has the following attributes: (1) no active magnet is required for normal operation of the separator, only for periodic recharge of the remnant magnetic field; (2) back-flushing can be accomplished by flowrate control and gas injection, thus simplifying the configuration; (3) the matrix is modular, which enables convenient scaleup, ease of replacement for maintenance and flexibility for continuous operation; and (4) separator performance characteristics can be modified for seasonal variation of feed by changing packing material; and (5) matrix packing material is commercially available and inexpensive.

Thus, it can be seen that the use of magnetites to remove heavy metal contaminants is effective regardless of the mode of application. The binding of heavy metals to magnetites may be able to be enhanced with the selective use of organic chelators. The use of remnant field magnets to perform magnetic separations has been established. These fields appear stable over month-long time periods and the use of inexpensive stainless steel wool matrices also provide good results. Separation of 5 micron sized particles is effective using these remnant field magnetic separators. Both loading and unloading of the magnetic separator can be controlled by flow velocity and gas sparging, respectively.

The present invention provides methods and apparatus for the remediation of heavy metals from a waste stream that requires inexpensive materials and equipment. Because the wastes generated from this approach are less, more compact than traditional metal hydroxides and robust with respect to conventional leaching in land fills, the disposal costs associated with this technique are reduced as well.

EXAMPLES

Example 1

As mentioned above, it appears that calcium is the principal interfering ion (83.5 ppm in LMDT waters) in the magnetite formation process.

Initially attempts were made to remove calcium from water by alkaline precipitation, followed by filtration and subsequent magnetite formation. The addition of sodium hydroxide to pH 11 followed by filtration of the white precipitate, assumed to be calcium hydroxide. Once treated, the water magnetites were successfully formed. Such an approach however, was deemed unacceptable however since almost any contaminating metal would also precipitate thereby rendering further treatment unnecessary. This high of a pH would also make the resulting sludge volumes enormous.

Next the addition of strong calcium complexing agents was tried (NTA, EDTA) which worked, but again, the cost of these reagents were too high to form the basis of a treatment plan. These experiments did confirm that calcium is the "bad" player in this process.

The next attempt to circumvent this obstacle was to seed with small amounts of preformed magnetite. Unlike the lack of success with the initial experiments using standard magnetite synthesis, this approach produced good results toward low temperature synthesis of magnetites.

The first experiments were conducted by adding 5 $\mu$m sized magnetite particles to the water to be treated followed by stoichiometric additions of ferrous and ferric sulfates. These solutions were deoxygenated using argon or nitrogen, chilled to 6° C. and NaOH was added to adjust the pH to approximately 8–9. The reaction was monitored visually by watching the initially formed green floc change into black magnetite over 15–45 minutes. The amounts of each substance and the results are shown in Table 1. The preformed magnetites showed distinct differences in catalysis dependent upon their origin. Commercially available magnetites showed less catalytic activity than preformed magnetites.

TABLE 1

Low Temperature (6° C.) Seeding of Magnetites

| magnetite added | Fe (II) sulfate | Fe (III) sulfate | water source | conversion to magnetite |
|---|---|---|---|---|
| 100 ppm | 31.2 ppm | 68.8 ppm | SAMD | yes |
| 0 | 31.2 | 68.8 | SAMD | no |
| 500 | 300 | 500 | LMDT | yes |
| 0 | 300 | 500 | LMDT | no |
| 216 | 83 | 133 | distilled | yes |
| 216 | 83 | 133 | LMDT | yes |
| 0 | 83 | 133 | LMDT* | no |

SAMD = simulate acid mind drain water
LMDT = actual Leadville facility water source
*15°

Regardless of which magnetite sources were used, it is readily apparent in Table 1 that magnetites are formed at 6° C. using either distilled water or LMDT water samples when seeded with magnetite. From work on the aforementioned experiments, it was shown that the presence of calcium ions had a deleterious effect on the formation of magnetites. This is believed to be due to a competition between formation of calcium hydroxide and magnetite when the pH is adjusted to 9. Tests have been conducted to determine whether calcium is removed by the preformed magnetite by surface adsorption. There is no indication that this occurs. The calcium levels before and after suspension of magnetite are exactly the same. Therefore, it can be concluded that the magnetite added actually catalyzes the growth of magnetite crystals.

Example 2

Powder X-ray diffraction (hereinafter "XRD") experiments were performed on the magnetites formed both from high and low temperature work on commercial magnetite and magnetites (ferrites) synthesized from LMDT waters and synthesized magnetites with metal substitutes. The results of these studies showed diffraction angles identical to commercially available magnetites. This confirms that the process disclosed herein actually forms magnetites and not some other dark colored iron oxide. Literature XRD spectra (JCPDS) of maghemite and hematite were also compared. Very different lines are reported for these forms of iron oxide which confirmed the synthesis of magnetite and not these other iron oxides. Examples of XRD spectra are summarized in Table 2.

TABLE 2

XRD data on magnetites

| Substrat | D-Spacing Values, in $ | | | | | |
|---|---|---|---|---|---|---|
| JCPDS | 4.850 | 2.964 | 2.528 | 2.094 | 1.711 | 1.613 |
| Commercial Magnetite | 4.795 | 2.947 | 2.516 | 2.086 | 1.707 | 1.608 |
| synthetic magnetite, 70° C. | 4.792 | 2.945 | 2.516 | 2.083 | 1.708 | 1.608 |

TABLE 2-continued

XRD data on magnetites

| Substrat | | D-Spacing Values, in $ | | | | |
|---|---|---|---|---|---|---|
| synthetic magnetite, 5° C. | peak not resolved | 2.953 | 2.523 | 2.085 | 1.703 | 1.607 |
| synthetic, Hg, 70° C. | peak not resolved | 2.934 | 2.512 | 2.082 | 1.701 | 1.604 |
| synthetic, Cu, 70° C. | peak not resolved | 2.938 | 2.514 | 2.083 | 1.705 | 1.611 |
| synthetic, Leadville, 5° C. | peak not resolved | 2.953 | 2.523 | 2.085 | 1.703 | 1.607 |

Example 3

Removal of higher concentrations of metal contaminants have also been examined and these have yielded excellent results as well. These are shown in Tables 3 and 4.

TABLE 3

Manganese Removal at varying Mn doses. T = 6.0° C.

| Iron dose:Metal Dose (mole ratios) | Initial Mn dose (ppm) | Mn remaining (ppm) |
|---|---|---|
| 20:1 | 5 | below detection limits |
| 10:1 | 10 | 0.12 |
| 5:1 | 20 | 0.24 |
| 4:1 | 25 | 0.42 |
| 1.3:1 | 30 | 0.25 |

TABLE 4

Lead Removal at varying Pb doses. T = 6.0° C.

| Iron dose:Metal Dose (mole ratios) | Initial Mn dose (ppm) | Mn remaining (ppm) |
|---|---|---|
| 20:1 | 5 | below detection limits |
| 10:1 | 10 | below detection limits |
| 5:1 | 20 | 0.022 |
| 4.5:1 | 22 | 0.12 |

These studies showed that magnetite doses can remain fairly low, with respect to contaminant levels, and still provide good remediation.

The remediation of cadmium(II) from solution was also examined. In these studies magnetites were formed as described above and the magnetic separation was used to "filter" the water. In each instance, initial 50 ppb cadmium levels were reduced to below a 1 ppb detection limit. These experiments demonstrated the efficacy of the in-situ preparation method as well as magnetic separation.

Example 4

Test were performed to determine the ability of magnetite to remove cadmium from solution. Table 5 presents the results of those tests.

TABLE 5

Removal of Cd from aqueous media

| initial Cd level | magnetite dose | final Cd level | % removal |
|---|---|---|---|
| unactivated commercial magnetite distilled water source | | | |
| 14 ppm | 100 ppm | 4.3 ppm | 69 |
| 25 ppm | 100 ppm | 6 ppm | 76 |
| 38 ppm | 100 ppm | 2 ppm | 95 |
| 20 ppm | 500 ppm | 2 ppm | 90 |
| 30 ppm | 500 ppm | 6 ppm | 80 |
| unactivated commercial magnetite Pvville water source | | | |
| 390 ppb | 100 ppm | 218 ppb | 44 |
| 390 ppb | 250 ppm | 82 ppb | 79 |
| 390 ppb | 500 ppm | 22 ppb | 94 |
| activated commercial magnetite Leadville water source | | | |
| 390 ppb | 500 ppm | 4 ppb | 99 |
| 390 ppb | 500 ppm | <4 ppb | >80 |
| synthesized magnetites Leadville water source | | | |
| 20 ppb | 100 ppm | below 1 ppb detection limit | >99 |

Example 5

Tests were performed to determine the ability of magnetite to remove cadmium from solution. Table 6 presents the results of those tests.

TABLE 6

Removal of Cd from aqueous media

| initial Cd level | magnetite dose | final Cd level | % removal |
|---|---|---|---|
| unactivated commercial magnetite Pbville water source | | | |
| 200 ppb | 100 ppm | 41 ppb | 80 |
| 200 ppb | 250 ppm | 2 ppb | 99 |
| 200 ppb | 500 ppm | <2 ppb | >99 |

Tests were performed to determine the ability of magnetite to remove lead from solution. Table 7 presents the results of those tests

TABLE 7

Removal of Pb from aqueous media

| initial Pb level | magnetite dose | final Pb level | % removal |
|---|---|---|---|
| unactivated commercial magnetite Pbville water source | | | |
| 5 ppm | 25 ppm | 53.4 ppb | 99 |
| 5 ppm | 50 ppm | 63.3 ppb | 99 |
| 5 ppm | 75 ppm | 2.6 ppb | >99 |
| 5 ppm | 100 ppm | below det limit | >99 |
| 10 ppm | 100 ppm | 90.9 ppb | 99 |
| 15 ppm | 100 ppm | 130 ppb | 99 |
| 20 ppm | 100 ppm | 133.3 ppb | 99 |

Example 6

Binding in the Presence of Organics

Since earlier studies had shown that added organics can influence the removal of heavy metals using magnetites, similar studies were carried out in the presence and absence of selected co-contaminants. Lead(II) was selected as the target metal since it has shown the best experimental reproducibility. The experiments were carried out as described above except that various concentrations of organic chelators were also added to the solution. The initial lead concentration is $10^{-5}$M.

Three structurally related chelating agents were studied to determine whether they can compete effectively with the magnetite surface for the $Pb^{2+}$ ion. The chelators were acetate, oxalate and malonate as derived from the parent acids. These three were used because of their structural similarities to each other as well as to functional groups found in humic acids and common man-made chelators such as EDTA.

There were significant differences between acetate or malonate being present versus no organics at all. At the highest pH used, greater than 90% removal of lead was observed for no organics present. This is in contrast to when acetic acid or malonic acid was present. A marked decrease in removal efficiencies was observed, even at the $10^{-5}$M level, which is approximately where the initial lead concentration was set. Even at the highest pHs studied, no greater than about 65% removal of lead was observed. This is believed to represent competition between the chelator with the magnetite for the lead ion. At the $10^{-4}$M concentration, the lead is probably coordinated by two or three organic ligands to give the lead complex an overall negative charge since each ligand has a negative charge when fully deprotonated. The binding constants for lead (II) with these ligands range between $10^2$ to $10^6$. As the pH of the solution is raised, the charge on the magnetite surface becomes more negative and unable to bind the acetato or malononatoplumbate(II) ion.

In this study, addition of oxalic acid to the solution enhances the removal of lead from solution. Although this could be due to precipitation of lead oxalate, the concentrations used in this study do not exceed the solubility of lead oxalate ($K_{sp}=10^{-8}$) and at the highest oxalate concentration in this study $Q_{sp}=10^{-9}$. Control experiments where the lead and oxalate ions are added in the absence of magnetite show no decrease in the lead concentrations before and after mixing, except at pH 10, where a decrease that may tentatively be attribute to precipitation of $PbC2O_4$ is observed. At the lower pHs however, no precipitation of lead(II) oxalate or lead(II) hydroxide was detected.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A process for removing heavy metals from water comprising the steps of:

subjecting a solid matrix to an external magnetic field to induce remnant magnetism therein;

introducing magnetite to a quantity of water containing at least one heavy metal;

mixing the magnetite with the water such that at least a portion of the heavy metal in the water is bound to the magnetite to form bound metal;

contacting the bound metal with the solid matrix without simultaneously applying an external magnetic field to the matrix, wherein the matrix displays sufficient remnant magnetism to bind the bound metal to the matrix during the contacting step; and subsequently separating the water from the matrix and bound metal.

2. A process for removing metal from water as defined in claim 1 further comprising the step of flowing the water through the solid matrix such that the magnetite magnetically binds to the solid matrix.

3. A process for removing heavy metals from water as defined in claim 2 wherein the superficial velocity of the water through the matrix is in the range of from about 0.5 cm/sec to about 2.0 cm/sec.

4. A process of removing heavy metals from water as defined in claim 2 wherein the superficial velocity of water through the matrix is about 1 cm/sec.

5. A process for removing metal from water as defined in claim 1 wherein the solid matrix is steel wool.

6. A process for removing metal from water as defined in claim 1 wherein said heavy metals are selected from the group consisting of transition metals, actinides, and lanthanides.

7. A process for removing heavy metals from water as defined in claim 2 further comprising the step of removing the magnetite and bound heavy metal from the matrix by reversing fluid flow through the matrix.

8. A process for removing heavy metals from water as defined in claim 7 wherein the reverse fluid flow comprises air mixed with water.

9. A process for removing heavy metals from water as defined in claim 7 wherein the reverse fluid flow comprises water.

10. A process for removing heavy metals from water as defined in claim 7 wherein the reverse flow through the matrix has a superficial velocity in the range of from about 2 cm/sec to about 10 cm/sec.

11. A process for removing heavy metals from water as defined in claim 7 further comprising the step of collecting and disposing of the magnetite and bound heavy metal removed from the matrix.

12. A process for removing heavy metals from water as defined in claim 1 wherein the step of introducing magnetite to a quantity of water comprises adding a quantity of pre-formed magnetite to the water.

13. A process for removing heavy metals from water as defined in claim 12 wherein at least a portion of the heavy metal is adsorbed onto the surface of the magnetite.

\* \* \* \* \*